(12) United States Patent
van Zwol et al.

(10) Patent No.: US 8,156,002 B2
(45) Date of Patent: Apr. 10, 2012

(54) CONTEXTUAL AD MATCHING STRATEGIES THAT INCORPORATE AUTHOR FEEDBACK

(75) Inventors: Roelof van Zwol, Barcelona (ES); Vanessa Murdock, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 831 days.

(21) Appl. No.: 11/870,026

(22) Filed: Oct. 10, 2007

(65) Prior Publication Data

US 2009/0125372 A1 May 14, 2009

(51) Int. Cl.
*G06Q 30/00* (2006.01)
(52) U.S. Cl. ............... 705/14.41; 705/14.43; 705/14.72; 705/14.73
(58) Field of Classification Search ............... 705/14.41, 705/14.43, 14.72, 14.73
See application file for complete search history.

(56) References Cited

U.S. PATENT DOCUMENTS

| | | | | |
|---|---|---|---|---|
| 2001/0042064 A1* | 11/2001 | Davis et al. | .................. | 707/3 |
| 2001/0047354 A1* | 11/2001 | Davis et al. | .................. | 707/3 |
| 2001/0049661 A1* | 12/2001 | Power et al. | .................. | 705/51 |
| 2001/0051940 A1* | 12/2001 | Soulanille | .................. | 707/3 |
| 2002/0165849 A1* | 11/2002 | Singh et al. | .................. | 707/1 |
| 2002/0169760 A1* | 11/2002 | Cheung et al. | ................. | 707/3 |
| 2003/0216930 A1* | 11/2003 | Dunham et al. | ................ | 705/1 |
| 2004/0059712 A1* | 3/2004 | Dean et al. | ................... | 707/1 |
| 2004/0093327 A1* | 5/2004 | Anderson et al. | ............... | 707/3 |
| 2004/0205065 A1* | 10/2004 | Petras et al. | .................. | 707/5 |
| 2005/0021397 A1* | 1/2005 | Cui et al. | .................... | 705/14 |
| 2005/0065806 A1* | 3/2005 | Harik | .......................... | 705/1 |
| 2005/0114198 A1* | 5/2005 | Koningstein et al. | ........... | 705/10 |
| 2005/0262428 A1* | 11/2005 | Little et al. | ................. | 715/501.1 |
| 2006/0259455 A1* | 11/2006 | Anderson et al. | ............... | 707/1 |
| 2007/0027765 A1* | 2/2007 | Collins et al. | ................ | 705/14 |
| 2007/0150457 A1* | 6/2007 | Goldman et al. | ................ | 707/3 |
| 2007/0179849 A1* | 8/2007 | Jain | ............................. | 705/14 |
| 2008/0140502 A1* | 6/2008 | Birnholz et al. | ............... | 705/10 |
| 2008/0235085 A1* | 9/2008 | Kovinsky et al. | ............... | 705/14 |
| 2008/0306824 A1* | 12/2008 | Parkinson | ....................... | 705/14 |
| 2009/0024468 A1* | 1/2009 | Broder et al. | ................. | 705/14 |
| 2009/0248662 A1* | 10/2009 | Murdock | ......................... | 707/5 |
| 2010/0138451 A1* | 6/2010 | Henkin et al. | ............... | 707/803 |

* cited by examiner

*Primary Examiner* — Jagdish Patel
*Assistant Examiner* — Kenneth Bartley
(74) *Attorney, Agent, or Firm* — Stattler-Suh PC

(57) ABSTRACT

An ad matching system that includes an interactive client permits a triggering Web page author to provide feedback on a candidate advertisement for the page. Author feedback is used to rank ads for display on the triggering page. Preferably author feedback is also incorporated into ad clustering and/or ad ranking formulae within the system. Also, author credibility is judged based on author feedback and on click through rates of placed ads.

14 Claims, 3 Drawing Sheets

CONTEXTUAL AD MATCHING STRATEGIES THAT INCORPORATE AUTHOR FEEDBACK

BACKGROUND OF THE INVENTION

1. Field of the Invention

The field relates to contextual ad matching, particularly content-targeted online advertising.

2. Art Background

The Internet is an increasingly important media outlet. Thus, online advertising is growing rapidly. Search-based advertisers have dominated the industry, and their success has prompted expansion beyond displaying ads alongside search results.

One respected form of search-based advertising is keyword-targeted advertising, where ads are displayed based in part on user search terms. Practitioners of this type of advertising, among them the largest search engines, have introduced strategies that attempt to match ads with user interests on non-search pages. Typically these content-targeted advertising strategies use Web page content as a proxy for user interest and match ads to content. A typical page involves much more information than a typical search query, and thus the content-targeted strategies tend to be much more complex than keyword-targeted strategies.

Current models for content match aim to match relevant advertisements to Web pages, through the unsupervised analysis of the page content. It is widely known among practitioners of content-targeted advertising that relevance is important. First, high congruency has been shown to increase click through rates and thereby profits. (Yoo, C. Y. "Preattentive Processing of Web Advertising", PhD Thesis, University of Texas at Austin, 2006). Second, proposals for improved targeting methods have cited research showing that users view irrelevant ads as annoyances. (Ribeiro-Neto, B. N., Cristo, M. Golgher, P. B., De Moura, E. S. "Impedance Coupling in Content-Targeted Advertising." Proceedings of the $28^{th}$ Annual ACM SIGIR Conference. ACM Press. 2005.) Third, placing ads that are judged relevant, but are crossly inappropriate can pose a danger to the brands of both the ad distributor and the ad publisher.

Despite the importance of relevance, content-targeting systems currently in use place irrelevant ads. Even leading edge systems often make poor placements when the ad and page are topically related, but for some reason inappropriate. Misplacements are also common when few ads are classified as related to the web page topic. (Lacerda, A., Cristo, M., Conçalves, M. A., Fan, W., Ziviani, N., and Ribeiro-Neto, B. N. "Learning to Advertise", Proceedings of the $29^{th}$ Annual ACM SIGIR Conference. ACM Press. 2006.) Contextual advertising systems are ill equipped to determine the appropriateness of an ad, because often an ad that is inappropriate (e.g., an ad of a product placed in the Web page of its direct competitor) may be highly topically relevant.

Ribeiro-Neto 2005 and Lacerda 2006 propose improvements to then-state-of-the-art content-targeting systems. The first set of improvement relies on incorporating additional terms into the matching process, in some cases derived from a probabilistic model. In the second paper, the improvement comes from optimization of the ads ranking function via genetic programming. Though both methods result in improvement over standard methods, neither directly addresses inappropriate ad placements.

SUMMARY OF THE INVENTION

In one aspect, embodiments of the present invention relate to an interactive feedback client. Preferably the client is web-based and operates based on content from a triggering web page. Most preferably the triggering web page's author operates the client to provide feedback on candidate ads prospectively matched to the triggering web page by a system consistent with some embodiments.

An interactive feedback client consistent with some embodiments of the invention includes a page content display module configured to display a content region from the web page and an author-feedback submission module. The feedback submission module includes a candidate-ad display element and a decision submission element. The candidate-ad display element is configured to receive a candidate ad from an ad server, wherein the candidate ad has been matched to the web page by a contextual ad-matching method. The decision submission element is configured to solicit pair-quality feedback on the candidate ad-web page pair.

In another aspect, the present invention relates to an ad server. Preferably the ad server is configured to provide ads based on content from a triggering web page. Most preferably the triggering web page's author operates a client that provides feedback on candidate ads prospectively matched to the triggering web page by the ad server as outlined below and consistent with some embodiments.

An ad server consistent with some embodiments is configured to incorporate feedback on ad-web page pairs into its treatment of ads. An exemplary server comprises an ads ordering module, a feedback solicitation module, an ads ranking module, and an ads serving module.

The ads ordering module is configured to receive an initial collection of ads and to order the ads relative to a web page to form a collection of ordered ads. The feedback solicitation module is configured to provide a candidate ad from the collection to a feedback submission module that returns pair-quality feedback on the pairing of the candidate ad and the web page. The ads ranking module is configured to use the feedback on the pairing of the candidate ad and the web page and the collection of ordered ads to form a set of ranked ads relative to the web page. The ads serving module is configured to provide ads from the set of ranked ads for display on the web page.

In yet another aspect, the present invention relates to an ad-web page matching system. Preferably the system is configured to solicit feedback on ad-web page pairs and incorporate said feedback into its treatment of ads. Most preferably the web page's author operates a client that provides feedback on candidate ads prospectively matched to the page by the ad system as outlined below and consistent with some embodiments.

An ad-web page matching system consistent with some embodiments comprises an interactive feedback submission client and an ad server. The interactive feedback submission client includes a page content display module configured to display a content region from the web page and an author-feedback submission module that displays a candidate ad and solicits pair-quality feedback on the candidate ad-web page pair. The ad server includes an ads ordering module configured to order a collection of ads relative to the web page, a feedback solicitation module configured to provide the candidate ad from the collection to the author-feedback submission module, an ads ranking module configured to use the pair-quality feedback and the collection of ordered ads to form a set of ranked ads relative to the web page, and an ads serving module configured to provide ads from the set of ranked ads for display on the web page.

In still another aspect, some embodiments relate to methods of incorporating author feedback on ad-page pairs into a contextual advertising system. For example, a method comprising the following steps: displaying a content region from a triggering web page and a candidate ad to an author; receiving pair-quality feedback on the candidate ad-triggering web page pair from the author; forming a set of ranked ads relative to the triggering web page by using the pair-quality feedback and a collection of ranked ads; and providing ads from the set of ranked ads for display on the triggering web page.

DETAILED DESCRIPTION

This disclosure sets forth models for contextual ad matching that incorporate human feedback, preferably that of the content owner or "author".

As used herein, "author" refers to anyone with control over a triggering Web page on a site served by a system consistent with the present invention. "Triggering Web page" refers to the page on which ads are placed, and from which content is used to select ads. "Candidate ad" refers to an ad initially matched to a triggering web page and presented to an author for feedback. "Pair-quality feedback" refers to feedback on the match of a candidate ad with a triggering web page.

Architecture

Figure 1:
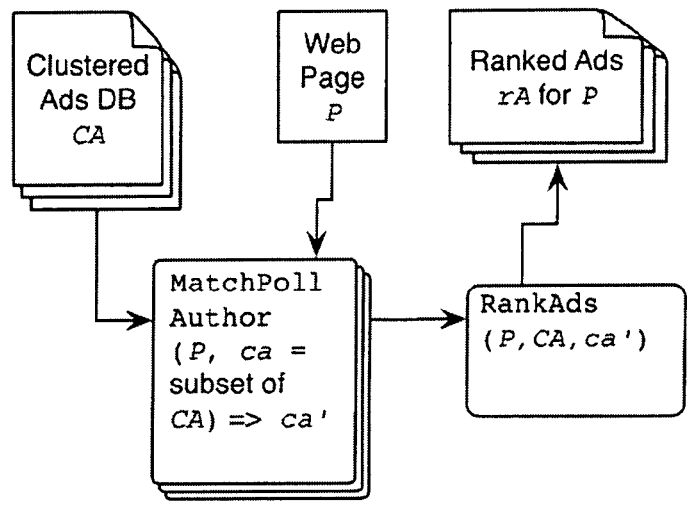
FIG. 1 shows architecture for a content-advertisement matching system that incorporates author feedback consistent with some embodiments of the present invention.

FIG. 1 illustrates a general architecture consistent with some embodiments of the invention. As shown, such embodiments comprise a clustered ads database CA, an ad match and author feedback module MatchPollAuthor, an ads ranking module RankAds, and a ranked ads collection rA. The architecture operates relative to the Web page P.

Initially ads are clustered offline, preferably by topic, within the ads database CA. When the author writes and publishes the triggering Web page P, the feedback module MatchPollAuthor retrieves clusters from CA and content from the web page P, and matches a set of advertisement clusters to content from P, preferably ranking them according to topical similarity. MatchPollAuthor then checks if the author is willing to collaborate, and if so, presents candidate ads from most relevant clusters to the author, who provides pair-quality feedback, e.g. judging an ad's appropriateness. In total, the author provides feedback on ca, some subset of CA, and as the author completes the session, MatchPollAuthor re-orders that subset as ca'.

The re-ordered subset ca', now ranked in a manner that includes the author feedback, is passed to RankAds. That subset, the clusters CA and the page P, are all used by RankAds to form a set of ranked ads rA relevant and appropriate to the page P. Based on this ranked set, ads are published to the page P as users browse it.

Preferably, embodiments include systems to incorporate author credibility into the above architecture, and use the author feedback to improve the clustering and/or ranking of ads. A system consistent with some embodiments that incorporates author feedback is shown in FIG. 2.

Figure 2:
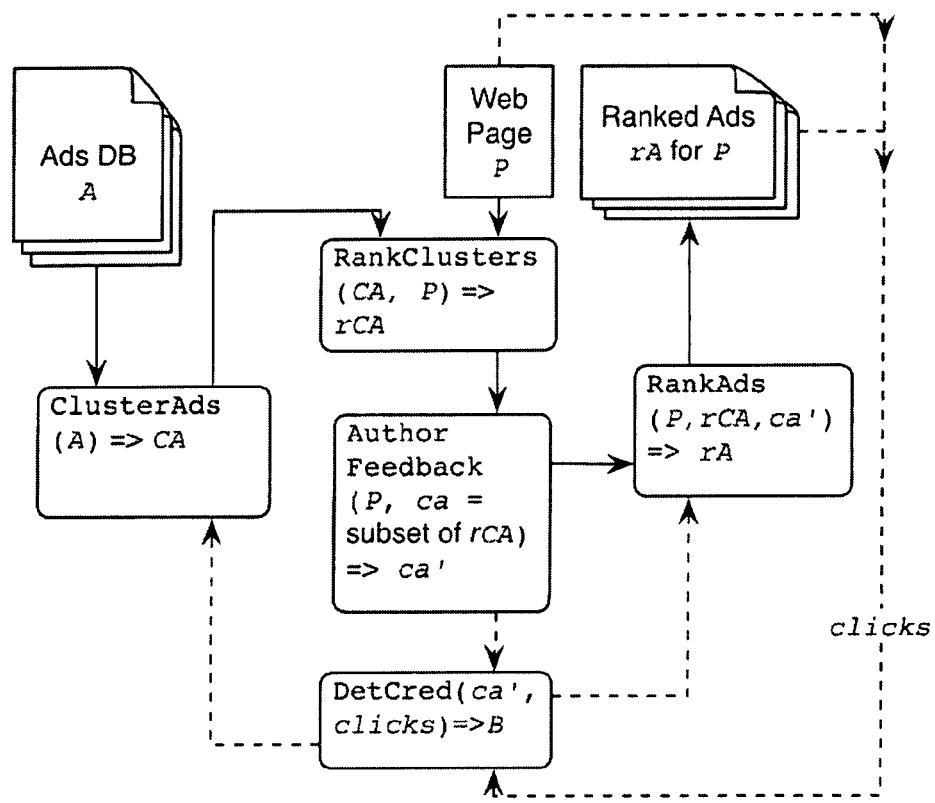
FIG. 2 shows architecture for a content-advertisement matching system that incorporates author feedback and determines author credibility consistent with some embodiments.

As shown, the system of FIG. 2 comprises an ads database A, an ad clustering module ClusterAds, a cluster ranking module RankClusters, an author feedback module AuthorFeedback, an ads ranking module RankAds, and a ranked ads collection rA. The architecture operates relative to the Web page P. The system further includes the author credibility module DetCred.

Initially ads are stored offline. Though the online ads can be clustered, preferably by topic, they need not be, in which case they are preferably initially clustered by topic in ClusterAds.

When the author writes and publishes the triggering Web page P, the cluster-ranking module RankClusters retrieves clusters from the clustered database CA formed in ClusterAds. Preferably the ads are retrieved from offline storage A and clustered initially prior to initiation of the match process by author publishing.

RankClusters also retrieves content from web page P, and matches a set of advertisement clusters to content from P, preferably ranking them according to topical similarity to form the ranked set of ad clusters rCA.

The author feedback module AuthorFeedback retrieves the ranked clusters rCA and content from the web page P, and AuthorFeedback then checks if the author is willing to collaborate, and if so, presents candidate ads from most relevant clusters to the author, who provides pair-quality feedback, e.g. classifies the ads as appropriate or not. In total, the author provides feedback on ca, some subset of rCA, and as the author completes the session, AuthorFeedback re-orders that subset as ca'.

The re-ordered subset ca', now ranked in a manner that includes the author feedback, is passed to RankAds. That subset, the ranked clusters rCA and the page P, are all used by RankAds to form a set of ranked ads rA relevant and appropriate to the page P. Based on this ranked set, ads are published to the page P as users browse it. The re-ordered subset ca' is also passed to the author credibility module DetCred.

The above-described process relates to an initial run of the system of FIG. 2 with no prior author feedback or credibility established. Following the initial run, users browse the web page P, sometimes clicking on the ads published to it. The record of clicks clicks is passed to the author credibility module DetCred. The re-ordered subset ca' and the clicks are used by DetCred to assess the credibility of the author and determine an author credibility score.

Preferably the author credibility score B is based on the click through rate of ads classified by the author and published to the author pages. However, this potentially omits part of the author's feedback, as negatively classified ads are unlikely to be displayed (in the absence of low author credibility). Thus, some embodiments use click through rates of ads that are similar (e.g. in the same topical cluster) to those classified negatively by the author in determining author credibility. Some embodiments use click through rates of ads classified negatively by the author on pages similar to the page P according to some similarity metric.

Once an author credibility score is established, it is preferably used to inform the weight given author opinion in other portions of the system. For example, author credibility is preferably used by RankAds to determine the extent to which author opinion, in the form of ca', is incorporated into the final ranking rA for page P. Further, the author feedback is preferably used to inform the current clustering of ads and in some embodiments the ranking function, but this is also preferably dependent on author credibility. Preferably the system does not serve ads classified as inappropriate, and that judgment counts against serving ads from the same cluster. However the system can still serve other ads from that same cluster, in the case that the author credibility is low, or in the presence of other strong indicators of a good match. In some embodiments the author credibility is used to determine a magnitude of confidence in a match necessary to disregard author feedback.

In addition, author credibility scores from embodiments can be exported to inform other aspects of the system owner's relationship with the author, or with pages controlled by the author. For example, in determining the weight assigned to a link from an author's page to another page in search ranking. In another example, the value of an author's clicking on advertisements in other pages could be weighted by that author's credibility score.

Preferably, once the author has provided relevance feedback, the clustering of ads and ranking of ads is dynamically improved by extracting features of the ad-Web page pair. For example, to dynamically improve the clustering of ads, author feedback ca' is used to provide relevance assessments on the ad clusters CA. Based on the author feedback, features of the ads are extracted and used to update the ad clustering system. Preferably ads are clustered based on similarity of vectors representing ad features, e.g. text, topic, structure, images etc. (Carrasco, J. J., Fain, D., Lang, K., Zhukov, L. "Clustering of bipartite advertiser-keyword graph." Proceedings of the Workshop on Clustering Large Datasets, IEEE Conference on Data Mining, IEEE Computer Society Press, 2003.) Author feedback can be used to re-weight the similarity function, or to introduce new aspects to the feature vector, thus changing the clustering.

Similarly, to dynamically improve the ranking of ads, author feedback ca' is used to update the ad ranking function. In typical cases, ads are ranked based on similarity of vectors representing ad features, e.g. text, structure, images etc, to features of the page P. (Carrasco, 2003.) Author feedback can be used to re-weight the similarity function, or to introduce new aspects to the feature vector, thus changing the ranking.

In either case, the author credibility score B is preferably used to weight the author input during dynamic improvement. Furthermore, ads introduced to the system after the user feedback has been incorporated are preferably clustered based on the dynamically improved functions that have incorporated the user feedback.

Interface

Figure 3:
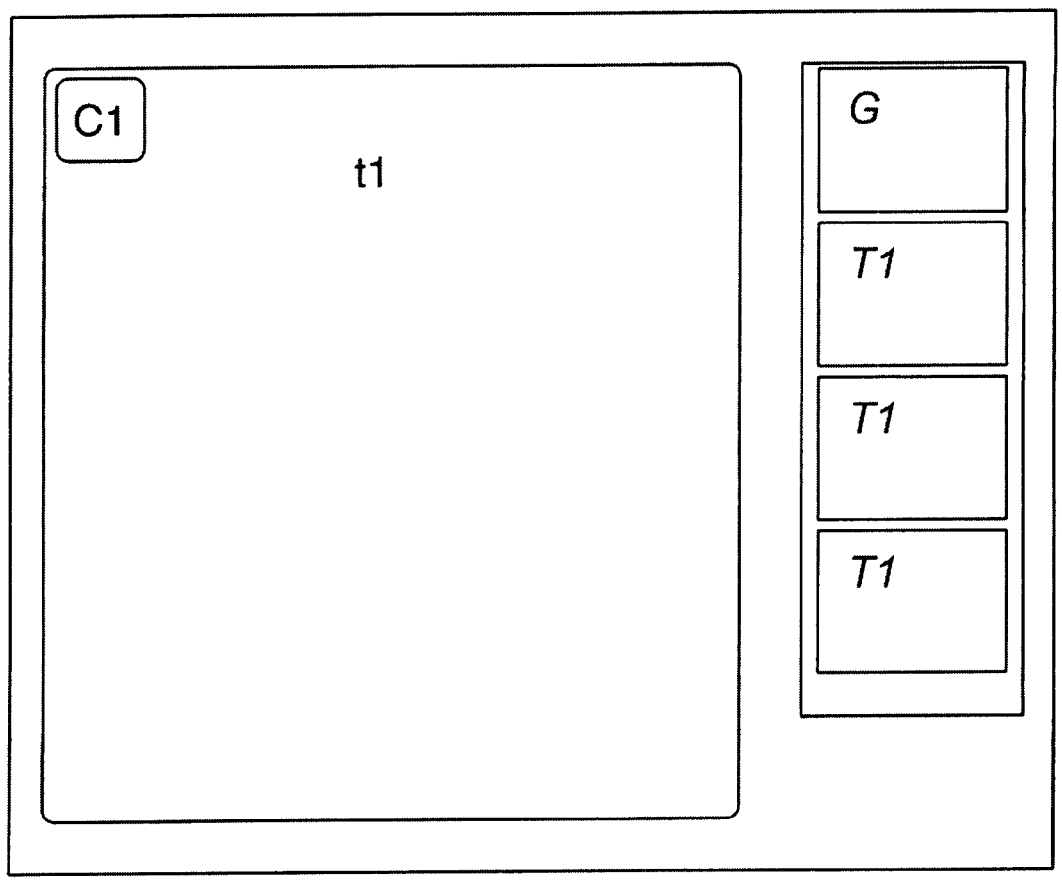
FIG. 3 is a schematic illustration of a web page including several content regions covering multiple topics and an advertising region including several advertisements.

Referring now to FIG. 3, an exemplary web page is shown. The page includes a content region relating to a topic and an ad list, with each ad relating to a topic. Standard content-targeting systems will typically match ads displayed to the topic of the page as determined by the system, typically that topic relates to the topic of a content region on the page. However, in some systems there are ads classified as relevant to all pages, regardless of page topic.

As shown, the content region C1 occupies the main portion of the page. In a now-typical layout, the ad list is positioned on the right and contains four ads. Content region C1 relates to topic t1. Based oil this content, and perhaps other factors, a content-targeted advertising system has placed one ad relating to topic G, for general, and three ads relating to topic T1, for a topic encompassing t1.

Figure 4:
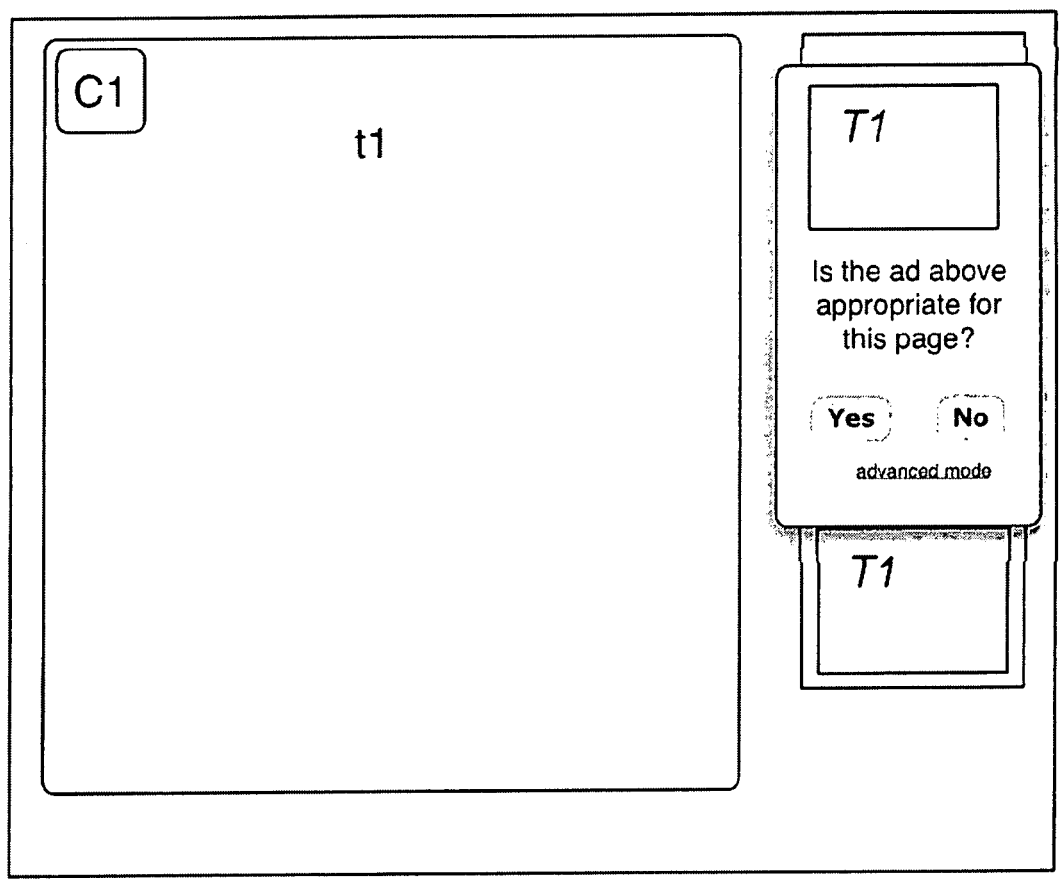
FIG. 4 is a schematic illustration of a web page including a feedback client for providing author feedback to a content-advertisement matching system consistent with some embodiments.

Referring now to FIG. 4, an exemplary embodiment of a feedback client consistent with the present invention is shown operating with the page of FIG. 3 as a triggering page. Preferably, embodiments of the invention use a lightweight interactive session with the content author, as shown by the pseudo-window of FIG. 4. Most preferably, such sessions take place in the author's control panel for their advertising subscription.

As illustrated, the interactive feedback client displays an ad related to topic T1, which encompasses topic t1 of content region C1. The client asks "Is the ad shown above relevant to the content of this page?" to which the author can click "Yes" or "No", or enter an "advanced mode" by clicking a link. Another possible questions: "Is the ad shown above appropriate to the content of this page?"

The advanced mode preferably asks multiple questions, asks the author to rate the strength of appropriateness, asks the author to highlight inappropriate terms in the advertisement, or asks for some other combination of responses.

Preferably during the author's administration of ad placement, when a new page is set up with advertising, an interactive session such as shown in FIG. 4 is started with the author. Most preferably a small number of advertisements representing each of the top ranked clusters are shown to the author. The author is asked to assess the relevance or appropriateness of the advertisement with respect to the page content. If the author is willing to collaborate, additional feedback can be given on different advertisements that are matched. Ads from relevant clusters are ranked according to their congruency with the Web page.

Advantages

Explicit feedback by the Web page author allows the system to avoid inappropriate matches. In addition, the author provides feedback that allows for the disambiguation of the topic of the ads and improves the congruency between the ads and the Web page. As shown in previous studies, a higher degree of congruency between ads and pages leads to higher click-through rates.

Embodiments potentially produce (1) higher click-through rates due to increased relevance and congruency between ads and Web pages, (2) improved filtering of inappropriate ads, (3) improved clustering of ads, (4) improved ad ranking. As a secondary benefit, the author gets a sense of control over the types of ads placed with their content, increased their trust in the system without sacrificing the advertising system owners actual control over the placement of ads.

The system owner retains control over the placement of ads because authors providing feedback on a representative of a cluster. If the particular ad is indicated as inappropriate that ad will preferably not be shown. However the system can still serve other ads from the same cluster, in the case that the author credibility is low, or in the presence of other strong indicators of a good match.

Although the present invention has been described in terms of specific exemplary embodiments, it will be appreciated that various modifications and alterations might be made by those skilled in the art without departing from the spirit and scope of the invention. The scope of the invention is not limited to the exemplary embodiments described and should be ascertained by inspecting the appended claims.

What is claimed is:

1. A computer implemented method of incorporating author feedback on placement of advertising in a webpage comprising:

receiving, by at least one computer, a webpage created by an author and at least one cluster of candidate advertisements, wherein the webpage comprises content and the candidate advertisements are topically similar to the content of the webpage;

ranking, by the computer, the candidate advertisements by degree of topical similarity to the webpage content;

pairing, by the computer, the ranked candidate advertisements to the webpage content;

receiving, by the computer, feedback provided by the author of the webpage regarding the placement of the candidate advertisements within the webpage, wherein the feedback comprises at least one of a binary opinion of the author on relevance of the candidate advertisement to the webpage and a binary opinion of the author on appropriateness of the candidate advertisement to the webpage;

retrieving, by the computer, a credibility score corresponding to click-through rates of previous advertisements upon which feedback has been provided;

ranking, by the computer, the candidate advertisements based on the feedback of the author and the credibility score;

selecting, by the computer, at least one advertisement from among the candidate advertisements for incorporation into the webpage;

transmitting, by the computer, the selected advertisement to a user;

receiving, at the computer, a selection of a link corresponding to the incorporated advertisement;

wherein if the author has a credibility score, incrementing, by the computer, the author credibility score based on the selection of the link; and wherein if the author does not have a credibility score, creating, by the computer, the author credibility score based on the selection of the link.

2. The computer implemented method of claim 1, wherein the cluster of candidate advertisements, prior to being selected for placement on the webpage, are clustered using an advertisement clustering function.

3. The computer implemented method of claim 2, wherein the advertisement clustering function incorporates feedback from a plurality of authors and a corresponding plurality of author credibility scores.

4. The computer implemented method of claim 1, wherein the author credibility score is based on the author's selection of advertising links in other webpages.

5. The computer implemented method of claim 1, wherein the author credibility score is based on the user's selection of a link corresponding to an advertisement that is similar to an advertisement on which negative feedback has been provided, and wherein the similar advertisement and the advertisement on which negative feedback has been provided are in a same cluster.

6. The computer implemented method of claim 1, wherein the feedback is used to update an advertisement ranking function based on the author credibility score.

7. The computer implemented method of claim 1, wherein the feedback is used to update an advertisement selection function based on the author credibility score.

8. A non-transitory computer readable medium that stores a set of instructions for incorporating author feedback on placement of advertising in a webpage which, when executed by a computer, cause the computer to perform the steps of:

receiving a webpage created by an author and at least one cluster of candidate advertisements, wherein the webpage includes content and the candidate advertisements are topically similar to the content of the webpage;

ranking the candidate advertisements by degree of topical similarity to the webpage content;

pairing the ranked candidate advertisements to the webpage content;

receiving feedback provided by the author of the webpage regarding the placement of the candidate advertisements within the webpage, wherein the feedback comprises at least one of a binary opinion of the author on relevance of the candidate advertisement to the webpage and a binary opinion of the author on appropriateness of the candidate advertisement to the webpage;

retrieving a credibility score corresponding to click-through rates of previous advertisements upon which feedback has been provided;

ranking the candidate advertisements based on the feedback of the author and the credibility score;

selecting at least one advertisement from among the candidate advertisements for incorporation into the webpage;

transmitting the selected advertisement to a user;

receiving a selection of a link corresponding to the incorporated advertisement;

wherein if the author has a credibility score, incrementing the author credibility score based on the selection of the link; and wherein if the author does not have a credibility score, creating the author credibility score based on the selection of the link.

9. The computer readable medium of claim 8, wherein the cluster of candidate advertisements, prior to being selected for placement on the webpage, are clustered using an advertisement clustering function.

10. The computer readable medium of claim 9, wherein the advertisement clustering function incorporates feedback from a plurality of authors and a corresponding plurality of author credibility scores.

11. The computer readable medium of claim 8, wherein the author credibility score is based on the author's selection of advertising links in other webpages.

12. The computer readable medium of claim 8, wherein the author credibility score is based on the user's selection of a link corresponding to an advertisement that is similar to an advertisement on which negative feedback has been provided, and wherein the similar advertisement and the advertisement on which negative feedback has been provided are in a same cluster.

13. The computer readable medium of claim 8, wherein the feedback is used to update an advertisement ranking function based on the author credibility score.

14. The computer readable medium of claim 8, wherein the feedback is used to update an advertisement selection function based on the author credibility score.

* * * * *